United States Patent
Izhar et al.

(10) Patent No.: US 10,956,245 B1
(45) Date of Patent: Mar. 23, 2021

(54) STORAGE SYSTEM WITH HOST-DIRECTED ERROR SCANNING OF SOLID-STATE STORAGE DEVICES

(71) Applicant: EMC IP Holding Company LLC, Hopkinton, MA (US)

(72) Inventors: Amnon Izhar, Brookline, MA (US); Patrick Weiler, Northborough, MA (US); Stephen Richard Ives, West Boylston, MA (US); Michael D. Garvey, Brimfield, MA (US); Dale Elliott, Northborough, MA (US); David Black, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 15/663,443

(22) Filed: Jul. 28, 2017

(51) Int. Cl.
*G06F 11/00* (2006.01)
*G06F 3/06* (2006.01)

(52) U.S. Cl.
CPC .......... *G06F 11/006* (2013.01); *G06F 3/0619* (2013.01); *G06F 3/0659* (2013.01); *G06F 3/0679* (2013.01)

(58) Field of Classification Search
CPC .... G06F 11/0787; G06F 3/064; G06F 3/0653; G11B 20/1816
See application file for complete search history.

(56) References Cited

U.S. PATENT DOCUMENTS

| 5,408,644 A * | 4/1995 | Schneider | G06F 12/0804 711/E12.019 |
| 6,253,272 B1 * | 6/2001 | Young | G06F 9/4418 710/310 |
| 6,978,343 B1 * | 12/2005 | Ichiriu | G11C 15/00 365/49.1 |
| 7,003,702 B2 * | 2/2006 | Budd | H03M 13/096 714/48 |

(Continued)

OTHER PUBLICATIONS

Kevin Marks, "An NVM Express Tutorial," Flash Memory Summit, 2013, 92 pages.

(Continued)

*Primary Examiner* — Loan L. T. Truong
(74) *Attorney, Agent, or Firm* — Ryan, Mason & Lewis, LLP (57) ABSTRACT

A storage system in one embodiment comprises a host processor, and a solid-state storage device coupled to the host processor and comprising a non-volatile memory and a storage controller. The host processor is configured to initiate an error scanning operation on a designated portion of the non-volatile memory by directing at least one read command to the storage controller. The read command is configured to indicate to the storage controller that data read from the non-volatile memory responsive to the read command is not to be returned to the host processor. For example, the read command may illustratively comprise a Scatter Gather List (SGL) bit bucket descriptor indicating that the data read from the non-volatile memory responsive to the read command is to be discarded rather than returned (Continued)

to the host processor. The storage controller records any detected errors in a media error log and notifies the host processor of such errors.

20 Claims, 2 Drawing Sheets

(56) References Cited

U.S. PATENT DOCUMENTS

| | | | | |
|---|---|---|---|---|
| 7,590,884 B2* | 9/2009 | Daikokuya | ........... | G06F 3/0619 711/118 |
| 8,751,699 B1* | 6/2014 | Tsai | ........... | G06F 3/0605 710/17 |
| 8,868,517 B2* | 10/2014 | Gygi | ........... | G06F 13/28 707/687 |
| 8,949,502 B2* | 2/2015 | McKnight | ........... | G06F 1/30 710/22 |
| 8,966,164 B1* | 2/2015 | Asnaashari | ........... | G06F 12/0246 711/103 |
| 9,128,634 B1* | 9/2015 | Kang | ........... | G06F 3/0659 |
| 9,432,298 B1* | 8/2016 | Smith | ........... | H04L 49/9057 |
| 9,798,623 B2* | 10/2017 | Yulizar | ........... | G11B 20/10527 |
| 10,095,433 B1* | 10/2018 | Gao | ........... | G06F 3/0628 |
| 10,108,481 B1* | 10/2018 | Kataria | ........... | G06F 11/0793 |
| 2002/0091844 A1* | 7/2002 | Craft | ........... | G06F 5/10 709/230 |
| 2002/0169996 A1* | 11/2002 | King | ........... | G06F 11/0727 714/6.13 |
| 2004/0123202 A1* | 6/2004 | Talagala | ........... | G06F 11/1076 714/736 |
| 2004/0196291 A1* | 10/2004 | Porchet | ........... | H04N 5/926 345/543 |
| 2005/0005063 A1* | 1/2005 | Liu | ........... | G06F 3/0611 711/112 |
| 2005/0188238 A1* | 8/2005 | Gaertner | ........... | G11B 20/18 714/2 |
| 2006/0156117 A1* | 7/2006 | Maruyama | ........... | G06F 11/27 714/726 |
| 2006/0259570 A1* | 11/2006 | Feng | ........... | H04L 67/1097 709/213 |
| 2006/0265568 A1* | 11/2006 | Burton | ........... | G06F 12/0862 711/216 |
| 2007/0002482 A1* | 1/2007 | Daikokuya | ........... | G06F 3/0623 360/53 |
| 2007/0011398 A1* | 1/2007 | Van Niekerk | ........... | G06F 13/28 711/111 |
| 2007/0055829 A1* | 3/2007 | Rudelic | ........... | G06F 21/562 711/149 |
| 2007/0174678 A1* | 7/2007 | King | ........... | G06F 11/1435 714/6.13 |
| 2008/0126623 A1* | 5/2008 | Chang | ........... | G06F 13/4059 710/53 |
| 2008/0151411 A1* | 6/2008 | Yorimitsu | ........... | G11B 19/2054 360/75 |
| 2008/0168259 A1* | 7/2008 | Biran | ........... | G06F 13/28 712/207 |
| 2008/0209281 A1* | 8/2008 | Nagashima | ........... | G11B 20/1816 714/49 |
| 2008/0215829 A1* | 9/2008 | Lin | ........... | G06F 3/061 711/155 |
| 2008/0320342 A1* | 12/2008 | Imagawa | ........... | G06F 11/1016 714/53 |
| 2009/0172301 A1* | 7/2009 | Ebersole | ........... | G06F 13/385 711/154 |
| 2009/0172324 A1* | 7/2009 | Han | ........... | G11B 20/1879 711/162 |
| 2010/0232195 A1* | 9/2010 | Park | ........... | G11C 15/04 365/49.17 |
| 2011/0047322 A1 | 2/2011 | Allen et al. | | |
| 2011/0058573 A1* | 3/2011 | Balakavi | ........... | H04L 49/602 370/463 |
| 2011/0113313 A1* | 5/2011 | Thiesfeld | ........... | H03M 13/09 714/807 |
| 2011/0231730 A1 | 9/2011 | Allen | | |
| 2012/0110411 A1* | 5/2012 | Cheung | ........... | G06F 11/106 714/758 |
| 2012/0173792 A1* | 7/2012 | Lassa | ........... | G06F 9/4843 711/103 |
| 2012/0226942 A1* | 9/2012 | Gangasani | ........... | G06F 11/27 714/30 |
| 2012/0311716 A1* | 12/2012 | Amann | ........... | G06F 21/64 726/26 |
| 2013/0093611 A1* | 4/2013 | Crowley | ........... | G01S 7/4026 342/22 |
| 2013/0173972 A1 | 7/2013 | Kubo | | |
| 2013/0262398 A1* | 10/2013 | Gygi | ........... | G06F 13/28 707/687 |
| 2013/0275835 A1* | 10/2013 | Aswadhati | ........... | G06F 12/0246 714/773 |
| 2013/0346805 A1 | 12/2013 | Sprouse et al. | | |
| 2014/0215103 A1* | 7/2014 | Cohen | ........... | G06F 13/28 710/23 |
| 2014/0351627 A1* | 11/2014 | Best | ........... | G06F 11/2053 714/6.11 |
| 2015/0095554 A1* | 4/2015 | Asnaashari | ........... | G06F 12/0246 711/103 |
| 2015/0113341 A1 | 4/2015 | Frost et al. | | |
| 2015/0127882 A1* | 5/2015 | Carlson | ........... | G06F 12/0246 711/103 |
| 2015/0134888 A1 | 5/2015 | Kimberly et al. | | |
| 2015/0261475 A1* | 9/2015 | Alcantara | ........... | G06F 3/0656 710/56 |
| 2015/0293873 A1* | 10/2015 | Shao | ........... | G06F 13/4221 710/314 |
| 2015/0378808 A1* | 12/2015 | Kumar | ........... | G09C 1/00 714/799 |
| 2016/0034194 A1 | 2/2016 | Brokhman et al. | | |
| 2016/0239205 A1* | 8/2016 | Rothberg | ........... | G06F 3/064 |
| 2016/0291868 A1* | 10/2016 | Halaharivi | ........... | G06F 3/061 |
| 2017/0110199 A1 | 4/2017 | Li et al. | | |
| 2018/0107592 A1* | 4/2018 | Hashimoto | ........... | G06F 3/0619 |
| 2018/0129604 A1* | 5/2018 | Kim | ........... | G06F 1/3212 |
| 2018/0181421 A1* | 6/2018 | Connor | ........... | G06F 15/17306 |
| 2019/0056887 A1* | 2/2019 | Park | ........... | G06F 3/0679 |

OTHER PUBLICATIONS

NVM Express, "NVMe Specification," Revision 1.3, May 1, 2017, 282 pages.

* cited by examiner

STORAGE SYSTEM WITH HOST-DIRECTED ERROR SCANNING OF SOLID-STATE STORAGE DEVICES

FIELD

The field relates generally to information processing systems, and more particularly to storage in information processing systems.

BACKGROUND

Storage systems are increasingly utilizing non-volatile memory such as flash memory. For example, a given such system may illustratively comprise at least one storage tier comprising multiple solid-state drives (SSDs) which are implemented using flash memory or other types of non-volatile memory. All-flash storage arrays are also commonly implemented. In these and other single-tier or multi-tier storage systems that incorporate non-volatile memory, it is important to periodically scan the non-volatile memory for data retention errors that may be attributable to excessive wear or other factors.

SUMMARY

Illustrative embodiments of the present invention provide storage systems configured to implement an enhanced error scanning mode in one or more SSDs or other solid-state storage devices that include non-volatile memory. The enhanced error scanning mode is illustratively initiated by a host processor of the storage system using one or more read commands that indicate that the data is not to be returned to the host processor.

In one embodiment, a storage system comprises a host processor, and a solid-state storage device coupled to the host processor and comprising a non-volatile memory and a storage controller. The host processor is configured to initiate an error scanning operation on a designated portion of the non-volatile memory by directing at least one read command to the storage controller. The read command is configured to indicate to the storage controller that data read from the non-volatile memory responsive to the read command is not to be returned to the host processor.

Such an arrangement is beneficial in that not returning the actual data to the host processor saves bandwidth and also avoids contention in communication channels between the host processor and the storage controller. This is possible because the host processor in illustrative embodiments is not in need of the actual data itself. For example, the only information that is returned to the host processor in some embodiments is whether or not errors are found and if errors are found the location of any such errors, so that the host processor can take an appropriate action such as recovering the data.

The read command in some embodiments illustratively comprises a Scatter Gather List (SGL) bit bucket descriptor indicating that the data read from the non-volatile memory responsive to the read command is to be discarded rather than returned to the host processor.

It is possible in some embodiments that the read command can additionally or alternatively comprise a force-media-access parameter that is set by the host processor to instruct the storage controller to retrieve all available data from the non-volatile memory for each of a plurality of designated logical blocks. For example, an arrangement of this type may imply that the data has to be read back from the media in order to determine if any corruption has occurred from the time the data was written until it is read back.

Other information that can be incorporated into the read command includes a limit-media-error-recovery parameter that is set by the host processor to instruct the storage controller to more aggressively identify marginal instances of logical blocks in the designated portion of the non-volatile memory.

Additionally or alternatively, the read command can be configured by the host processor to instruct the storage controller to check available data integrity format protection information for the designated portion of the non-volatile memory.

The designated portion of the non-volatile memory subject to the error scanning operation may be identified by the read command as a particular set of logical block addresses that designate one or more portions of the non-volatile memory. For example, the designated portion of the non-volatile memory subject to the error scanning operation may comprise a portion of the non-volatile memory that is determined by the host processor to contain data of a higher importance level or greater value than data contained in other portions of the non-volatile memory.

For one or more errors detected by the storage controller as part of the error scanning operation, the storage controller may be configured to record information identifying the logical block(s) containing the one or more errors in a media error log, and to notify the host processor of the one or more errors.

These and other illustrative embodiments include, without limitation, apparatus, systems, methods and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
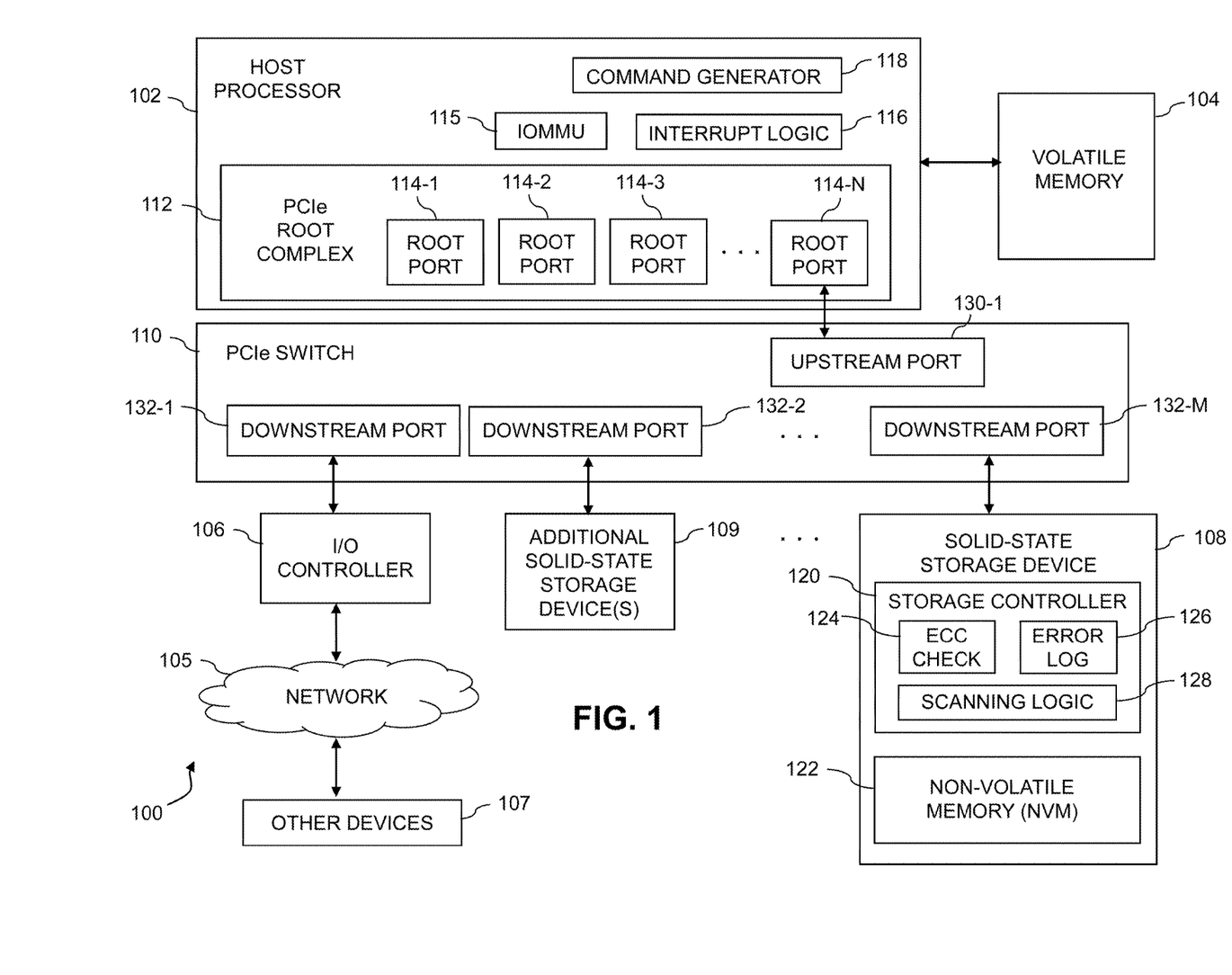
FIG. 1 is a block diagram of an information processing system comprising a storage system configured to implement a host-directed enhanced error scanning mode for a solid-state storage device in an illustrative embodiment.

FIG. 1 shows an information processing system 100 configured in accordance with an illustrative embodiment. The information processing system 100 comprises a storage system that includes a host processor 102, a volatile memory 104 associated with the host processor 102, an input-output (I/O) controller 106, a solid-state storage device 108, one or more additional solid state storage devices 109, and a peripheral component interconnect express (PCIe) switch 110. Although only single instances of certain storage system elements are shown in the figure, it is to be appreciated that other embodiments can include multiple instances of such elements. For example, the system 100 in other embodiments may comprise multiple storage systems each having different sets of elements 102, 104, 106, 108, 109 and 110. The one or more additional solid-state storage devices 109 may each be configured in substantially the same manner described below for solid-state storage device 108.

It should also be understood that certain storage system elements shown in the FIG. 1 embodiment need not be present in other embodiments. For example, the PCIe switch 110 may be eliminated in another embodiment, resulting in direct connection of elements 106, 108 and 109 to the host processor 102.

A network 105 couples the I/O controller 106 to other devices 107 of the information processing system 100 that are not considered part of the storage system. For example, the additional devices may comprise computers, virtual machines, containers or other types of processing devices that generate data within the system 100 for storage in the storage system comprising elements 102, 104, 106, 108, 109 and 110. Also by way of example only, such data generated within the system 100 can be moved between the other devices 107 and the I/O controller 106 using remote direct memory access (RDMA) connections over InfiniBand or Gigabit Ethernet. Numerous other types of connections and associated data transfer protocols can be used in other embodiments.

The I/O controller 106 in some embodiments is configured for connecting to other host devices such as other host processors of other computers or processing devices. Additionally or alternatively, the I/O controller 106 can be configured for connecting to other storage devices. As one example, the I/O controller may be implemented in the form of a serial attached SCSI (SAS) controller used to connect to SAS hard disk drives (HDDs), although a wide variety of other types of I/O controllers can be also be used.

It is apparent from the above that the other devices 107 in some embodiments comprise other host devices, other storage devices, or combinations of these and other devices.

The storage system further comprises a PCIe root complex 112 having a plurality of root ports 114-1, 114-2, 114-3, . . . 114-N. One or more of these root ports 114 are utilized to support communication between the I/O controller 106 and the solid-state storage device 108 via the host processor 102 and PCIe switch 110. In addition to the PCIe root complex 112, the host processor 102 illustratively comprises an I/O memory management unit (IOMMU) 115 and interrupt logic 116. The IOMMU 115 in some embodiments is configured to support virtualization functionality within the system 100.

Also included in the host processor 102 is a command generator 118. The command generator 118 is illustratively implemented at least in part in software executed by the host processor 102, although other arrangements are possible.

The command generator 118 generates one or more commands for causing the solid-state storage device 108 to enter various modes of operation and to perform other functions, as will be described in more detail below. The modes of operation in this embodiment include an enhanced error scanning mode of operation to be described in more detail below, and may include other modes associated with different background processes. The command generator 118 is illustratively configured to generate mode command as well as other types of commands, such as commands utilized to initiate an error scanning operation in the solid-state storage device 108. The term "error scanning operation" as used herein is intended to be broadly construed so as to encompass, for example, techniques commonly referred to in the context of flash memory and other types of non-volatile memory as "error scrubbing."

Although the volatile memory 104 is shown as separate from the host processor 102 in the FIG. 1 embodiment, in other embodiments the volatile memory 104 may be at least partially incorporated into the host processor 102. Accordingly, a volatile memory associated with a host processor in a given embodiment may comprise an internal volatile memory of the host processor. Numerous other arrangements are possible for volatile memory associated with a given host processor.

The solid-state storage device 108 comprises a storage controller 120 and a non-volatile memory 122. Non-volatile memory is also referred to herein as NVM. The storage controller 120 comprises an error correction code (ECC) check module 124, an error log 126 and scanning logic 128, all utilized in conjunction with an enhanced error scanning mode of operation. The storage controller 120 may include additional or alternative components of a type commonly included in solid-state storage device controllers, such as additional or alternative components associated with implementation of error scanning or other background processes. The scanning logic 128 illustratively controls the error scanning mode of operation once initiated by one or more commands from the host processor 102. Like the command generator 118, the scanning logic 128 and possibly one or more additional components of the storage controller 120 can be implemented at least in part in the form of software.

Examples of additional background processes that may be implemented in solid-state storage device 108 include one or more thermal throttling processes, one or more wear leveling processes, one or more garbage collection processes, and one or more processes of enforcing read or write disturb data retention policies. These and other background processes are assumed to be controlled by at least one background processes module of the solid-state storage device 108, although such a module is not explicitly shown in the figure.

The error log 126 is also referred to herein as a "media error log" and is used to store information characterizing errors located utilizing the ECC check module 124 or other error scanning components in the enhanced error scanning mode of operation of the solid-state storage device 108, under the control of the scanning logic 128.

The ECC check module 124 is assumed to be configured to also correct certain types of detected errors in accordance with the capability of its corresponding error correction code. For example, in some embodiments only those errors that are not correctable using the error correction code are recorded in the error log 126 for reporting to the host processor 102. The errors may be recorded by recording addresses of their corresponding logical blocks.

As mentioned previously, each of the one or more additional solid-state storage devices 109 may be configured to include a similar arrangement of elements, including storage controller 120 and non-volatile memory 122.

It is assumed that the volatile memory 104 of the host processor 102 comprises dynamic random access memory (DRAM) and that the non-volatile memory 122 of the solid-state storage device 108 comprises NAND-based flash memory. The use of DRAM in the volatile memory 104 provides the host processor 102 with a very low access times to read and write stored data, typically less than about 20 nanoseconds for both read and write operations. Non-volatile memory such as NAND-based flash memory typically has significantly higher access times, and in some cases may have minimum block size restrictions.

Although not explicitly shown in the figure, additional components are typically included in the solid-state storage device 108, such as, for example, at least a small amount of volatile memory and a plurality of base address registers (BARs).

A solid-state storage device comprising NAND-based flash memory typically utilizes a flash translation layer (FTL) in order to abstract the NAND hardware layer from the host device operating system and the associated file system. This allows the device firmware to distribute the writes from the operating system to the NAND-based flash in an even manner so as to avoid early failures of heavily-written areas of the NAND-based flash while maintaining a map of where data has been written and what regions are no longer valid in a given memory block.

The non-volatile memory 122 of solid-state storage device 108 can be implemented using single-level cell (SLC) memories, multi-level cell (MLC) memories, triple-level cell (TLC) memories or quad-level cell (QLC) memories, or combinations of these and other types of memories.

The volatile memory of the solid-state storage device 108 is illustratively a type of temporary memory that provides transient storage for data arriving in the solid-state storage device 108 before such data is subsequently persisted in the permanent non-volatile memory 122. The terms "temporary" and "permanent" as used herein are relative terms, and are intended to be broadly construed. Such terms should not be viewed as having any particular respective time periods associated therewith.

The temporary volatile memory in some embodiments may comprise memory implemented in or otherwise associated with a storage controller and utilized only for short-term buffering of data. Numerous other types and arrangements of temporary volatile memory may be used in other embodiments.

The solid-state storage device 108 may comprise a directly-addressable storage device. Such a directly-addressable storage device comprises, for example, a storage device that a host processor or I/O controller can access using PCIe reads and writes. Other types of solid-state storage devices can be used in other embodiments. The term "solid-state storage device" as used herein is therefore intended to be broadly construed.

The solid-state storage device 108 in some embodiments illustratively comprises one or more SSDs, although it should be understood that other types of storage technologies can be used in other embodiments. Also, combinations of multiple distinct types of storage technologies can be used to implement a given solid-state storage device as that term is generally used herein. The temporary volatile memory, if any, of the solid-state storage device 108 illustratively comprises DRAM, and as indicated previously the permanent non-volatile memory 122 illustratively comprises NAND-based flash memory, although other types of memories can be used in other embodiments.

Examples of other non-volatile alternatives to flash memory that may be utilized in a given implementation of the solid-state storage device 108 include resistive RAM, phase change memory, spin torque transfer magneto-resistive RAM (STT-MRAM) and Intel Optane™ devices based on 3D XPoint™ memory.

The FIG. 1 embodiment can be configured to implement common storage system operations such as write caching or journaling. For example, in conjunction with such operations, data that has been recently written to the storage system from one or more external hosts is stored in the volatile memory 104.

The PCIe switch 110 in the present embodiment comprises at least one upstream port 130-1. Such an upstream port may have at least one overlay BAR associated therewith. There may be multiple additional upstream ports and respective overlay BARs implemented within the PCIe switch 110 in a given embodiment, but such additional upstream ports and respective overlay BARs are omitted from the figure for simplicity and clarity of illustration. The upstream port 130-1 is shown in the figure as coupled to one of the root ports 114 of the PCIe root complex 112, illustratively root port 114-N.

The PCIe switch 110 further comprises a plurality of downstream ports 132-1, 132-2, . . . 132-M possibly also having respective overlay BARs associated therewith. The I/O controller 106 is coupled to the first downstream port 132-1 and the solid-state storage device 108 is coupled to the final downstream port 132-M. The one or more additional solid-state storage devices 109 are coupled to respective ones of one or more additional ones of the downstream ports, starting with downstream port 132-2 as shown in the figure. Other I/O controllers, solid-state storage devices or other types of PCIe devices can be similarly coupled to respective other ones of the downstream ports 132.

The particular coupling arrangements of upstream port 130-1 to root port 114-N and downstream ports 132-1 and 132-M to respective I/O controller 106 and solid-state storage device 108 are presented by way of illustrative example only, and numerous alternative coupling arrangements using other combinations of root ports, switch upstream and downstream ports and PCIe devices can be used in other embodiments. Also, as indicated previously, the PCIe switch 110 can be eliminated in other embodiments.

The I/O controller 106 is illustratively configured to transfer data received from the network 105 and/or other devices 107, and associated interrupts, as PCIe writes into downstream port 132-1 of PCIe switch 110. The PCIe writes may include separate PCIe writes for data and interrupts. These different types of PCIe writes can be identified by their respective address ranges. For example, a message signaled interrupt or MSI is implemented as a PCIe write to a predefined address range. The host processor 102 interprets PCIe writes to that address range as interrupts. Different processor families typically have different predefined or programmable address ranges for which PCIe writes to those address ranges are interpreted as interrupts rather than data.

In some embodiments, data is received in the I/O controller 106 from one or more of the other devices 107 via the network 105, although data can be received by I/O controller 106 in other ways. The I/O controller 106 generates a plurality of write operations in conjunction with receipt of data to be stored in the storage system. These write operations illustratively comprise respective PCIe writes. A given such PCIe write comprising one or more interrupts illustratively comprises one or more message signaled interrupts (MSIs) and is more particularly referred to herein as an MSI PCIe write.

Although communications between the host processor 102 and the solid-state storage device 108 are illustratively shown as utilizing PCIe connections in the present embodiment, other embodiments can use other types of connections. For example, alternative embodiments can use alternative types of interfaces such as Serial Attached SCSI (SAS) and Serial ATA (SATA). Numerous other interfaces and associated communication protocols can be used in other embodiments.

It is therefore to be appreciated that, as previously indicated above, PCIe switch 110 and PCIe root complex 112 can be entirely eliminated in other embodiments, and the solid-state storage device 108 can be directly connected to the host processor 102. The one or more additional solid-state storage devices 109 can similarly be directly connected to the host processor 102.

As mentioned above, the volatile memory 104 illustratively comprises a high-performance memory such as DRAM that can support large I/O bandwidths, and also has a relatively low latency. However, because this memory is volatile, data could be lost, for example, if the storage system were to lose power before the data could be saved to the non-volatile memory 122 of the solid-state storage device 108.

It is assumed that the storage system in the FIG. 1 embodiment illustratively includes one or more different types of temporary power backup (e.g., battery backup) in the event that the storage system power is lost. As indicated previously, the storage system in the FIG. 1 embodiment illustratively comprises at least elements 102, 104, 106, 108, 109 and 110 of the information processing system 100, but excludes network 105 and other devices 107.

As noted above, in a storage system that incorporates non-volatile memory, it is important to periodically scan the non-volatile memory for data retention errors that may be attributable to excessive wear or other factors. A conventional error scanning process typically involves actively reading pages of the non-volatile memory and detecting or correcting errors based on the error correcting code or other error correction and detection mechanism. However, the error scanning process is generally self-contained within firmware of the corresponding solid-state storage device and does not require host intervention. This leads to a number of significant drawbacks in the error scanning process. For example, the error scanning process generally does not report back to the host processor the specifics of which pages or blocks in the non-volatile memory have encountered significant errors. In addition, the error scanning process typically does not have any information regarding particular pages or blocks in the non-volatile memory that may currently contain more important data relative to other pages or blocks. Moreover, the conventional error scanning process can have a substantial negative impact on performance of the solid-state storage device. For example, the conventional error scanning process generally requires the storage controller to actively read pages, check for data validity and potentially erase blocks and rewrite data if data recovery is required, all of which can reduce the achievable performance level in situations in which the host processor is attempting to access data on the solid-state storage device at the same time.

Illustrative embodiments advantageously overcome these and other drawbacks of conventional arrangements.

As will be described in greater detail below, the solid-state storage device 108 in illustrative embodiments disclosed herein has an enhanced error scanning mode of operation that is initiated by the host processor 102 sending one or more particular commands to the solid-state storage device 108. The enhanced error scanning mode is illustratively utilized to scan designated portions of the non-volatile memory 122 of the solid-state storage device 108 for data retention errors that may be attributable to excessive wear or other factors. The enhanced error scanning mode of operation may be implemented as part of a background process of the solid-state storage device 108 or in other ways.

In the present embodiment, it is more particularly assumed that the host processor 102 is configured to initiate an error scanning operation on a designated portion of the non-volatile memory 122 of the solid-state storage device 108 by directing at least one read command to the storage controller 120. The read command is configured to indicate to the storage controller 120 that data read from the non-volatile memory 122 responsive to the read command is not to be returned to the host processor 102.

The host processor 102 controls the generation of the read command by command generator 118, and therefore controls initiation of the error scanning operation on the designated portion of the non-volatile memory 122. For example, the host processor 102 is illustratively configured to identify a period of relatively low host processor activity requiring minimal resources of the solid-state storage device 108, and to generate the read command for the identified period. This process of identifying periods of relatively low host processor activity can be repeated for multiple additional periods in order to initiate respective additional error scanning operations for other designated portions of the non-volatile memory 122.

The read command in some implementations identifies the designated portion of the non-volatile memory 122 subject to the error scanning operation as a particular set of logical block addresses (LBAs) that designate one or more portions of the non-volatile memory 122.

For example, the designated portion of the non-volatile memory 122 subject to the error scanning operation may comprise a portion of the non-volatile memory 122 that is determined by the host processor 102 to contain data of a higher importance level or greater value than data contained in other portions of the non-volatile memory 122.

As another example, the designated portion of the non-volatile memory 122 subject to the error scanning operation may comprise one or more portions of the non-volatile memory 122 that are each determined by the host processor 102 to contain valid host data.

The read command generated by the host processor 102 to initiate an error scanning operation illustratively comprises a Scatter Gather List (SGL) bit bucket descriptor indicating that the data read from the non-volatile memory 122 responsive to the read command is to be discarded rather than returned to the host processor 102.

Additional details regarding conventional aspects of the SGL bit bucket descriptor used in illustrative embodiments, and other command features and functionality associated with NVM Express (NVMe), can be found in the NVMe Specification, Revision 1.3, May 2017, which is incorporated by reference herein.

The read command in the present embodiment is illustratively further configured to include a force-media-access parameter that is set by the host processor 102 to instruct the storage controller 120 to retrieve all available data from the non-volatile memory 122 for each of a plurality of designated logical blocks. The force-media-access parameter may more particularly comprise a Force Unit Access (FUA) bit that is set by the host processor 102 to a logic one value in the read command.

Additionally or alternatively, the read command can comprise a limit-media-error-recovery parameter that is set by the host processor 102 to instruct the storage controller 120 to more aggressively identify marginal instances of logical blocks in the designated portion of the non-volatile memory 122. The limit-media-error-recovery parameter may more particularly comprise a Limited Retry (LR) bit that is set by the host processor 102 to a logic one value in the read command.

Other examples of configurations of one or more read commands to facilitate implementation of the enhanced error scanning mode of operation include configuring the read command to instruct the storage controller 120 to check available data integrity format protection information for the designated portion of the non-volatile memory 122. In such an arrangement, the host processor 102 instructs the storage controller 120 to check available data integrity format protection information by setting at least one of a Protection Information Check (PRCHK) field, an Initial Logical Block Reference Tag (ILBRT) field, a Logical Block Application Tag Mask (LBATM) field, and a Logical Block Application Tag (LBAT) field to respective designated values in the read command. Additional information regarding these fields can be found in the above-cited NVMe Specification, Revision 1.3.

The error scanning operation in the present embodiment illustratively comprises performing error correction code checks on data stored in the designated portion of the non-volatile memory 122. Other types of error scanning operations can be performed in other embodiments, and the term "error scanning operation" as used herein is therefore intended to be broadly construed. A given error scanning operation is illustratively performed in an error scanning mode of operation of the solid-state storage device 108 but can additionally or alternatively be performed in other operating modes. As indicated previously, error scanning as the term is broadly utilized herein is intended to encompass a wide variety of error scrubbing arrangements as well as other types of error scanning.

For a given error detected as part of an error scanning operation of the type described above, the storage controller 120 is configured to record information identifying a logical block containing the given error in the error log 126, and to notify the host processor 102 of the given error. The error notification(s) sent by the storage controller 120 can include, for example, separate notifications for each of a plurality of detected errors, or a single notification that identifies multiple detector errors.

The host processor 102 can be configured to respond to error notifications from the storage controller 120 in particular ways. For example, the host processor 102 in some embodiments is configured to initiate one or more operations responsive to an error notification from the storage controller relating to a particular logical block, including by way of example rewriting the logical block with data designated by the host processor 102, recovering the logical block using an available higher-level host protection mechanism, and instructing storage controller 120 to deallocate the logical block.

In the above embodiments, an enhanced error scanning mode is illustratively initiated by the host processor 102 using one or more read commands that indicate that the data is not to be returned to the host processor 102 by the solid-state storage device 108. The term "read command" in this context is intended to be broadly construed, and may comprise, for example, a set of commands or a combination of multiple commands, sub-commands, fields or other types of instruction structures suitable for conveying the corresponding information to the storage controller 120. Accordingly, some embodiments can use multiple read commands generated by the host processor 102 to initiate one or more error scanning operations by the solid-state storage device 108. A given read command may be part of a standard command set or may be a custom command such as a "vendor unique command" that is not part of a standard command set.

Such a command or set of commands are illustratively delivered from the host processor 102 via the root port 114-N of the PCIe root complex 112 through the upstream port 130-1 and the downstream port 132-M to the solid-state storage device 108.

In some embodiments, the initiation of the enhanced error scanning mode of operation is controlled by the host processor 102 to maximize or otherwise optimize write bandwidth of the solid-state storage device 108.

It is to be appreciated that these and other features of illustrative embodiments are presented by way of example only, and should not be construed as limiting in any way.

Accordingly, different numbers, types and arrangements of host processors and solid-state storage devices can be used in other embodiments.

Additional details regarding example process operations associated with an enhanced write bandwidth mode of operation in illustrative embodiments will be provided below in conjunction with the flow diagram of FIG. 2.

The storage system of the FIG. 1 embodiment may be configured to provide at least a portion of at least one storage tier of a multi-tier storage system. For example, the storage system may comprise at least part of a fast tier of a multi-tier storage system. The fast tier is also commonly referred to as a "performance tier." The fast tier or performance tier is an example of what is more generally referred to herein as a "front-end storage tier" of the multi-tier storage system. As another example, the storage system may comprise at least part of a capacity tier of a multi-tier storage system. The capacity tier is an example of what is more generally referred to herein as a "back-end storage tier" of the multi-tier storage system.

By way of example, a given multi-tier storage system may comprise a fast tier or performance tier implemented using server-based flash storage devices, and a capacity tier implemented using an object store. In such an arrangement, an I/O dispatcher software layer of the storage system may be configured, for example, to pre-fetch data from the object store of the capacity tier into the server-based flash storage devices of the fast tier or performance tier, as well as to support other types of data movement.

A wide variety of other types of server-based flash storage devices and multi-tier storage systems can be used in other embodiments, as will be apparent to those skilled in the art.

It is also possible that the storage system of the FIG. 1 embodiment may be part of a single-tier storage system. For example, it may be combined with additional similar systems or components in forming such a single-tier storage system.

A given storage tier of one of the types described above may comprise one or more object stores, including cloud-based object stores such as Amazon Simple Storage Service (S3), Google Cloud Platform Cloud Storage, and Microsoft Azure Blob Storage. Accordingly, cloud-based implementations of the FIG. 1 storage system are possible.

The particular storage drives used in a given storage tier may be varied depending on the particular needs of a given embodiment, and multiple distinct storage drive types may be used within a single storage tier. The term "storage drive" as used herein is intended to be broadly construed, so as to encompass, for example, disk drives, flash drives, solid-state drives, hybrid drives or other types of storage products and devices.

As another example, the storage system may be used to implement at least a portion of at least one storage node in a cluster file system. Such a cluster file system may comprise a parallel file system, a distributed file system or combinations of multiple file systems of potentially different types.

The storage system of FIG. 1 may be part of a larger storage platform. For example, such a storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX®, Symmetrix VMAX® and Unity™ storage arrays, commercially available from Dell EMC. Other types of storage products that can be used in implementing a given storage platform in an illustrative embodiment include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). By way of example, one or more of the other devices 107, as well as other system components, may be implemented at least in part using processing devices of such processing platforms.

As indicated above, communications between elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing PCIe cards of those devices, and networking protocols such as InfiniBand, Gigabit Ethernet or Fibre Channel. Numerous alternative networking arrangements are possible in a given embodiment, as will be appreciated by those skilled in the art.

Again, it should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, a computer, server or other host device having multiple CPU sockets each with a separate instance of volatile cache memory is considered a type of "host processor" as that term is broadly used herein. A host processor may also be referred to herein as simply a "host." The term "host" may also refer to a higher-level device such as computer or server that incorporates one or more host processors.

The operation of the information processing system 100 will now be described in further detail with reference to the flow diagram of FIG. 2. The process as shown includes steps 200 through 214, and is suitable for use in the system 100 but is more generally applicable to other types of information processing systems each comprising a host processor and one or more solid-state storage devices.

Figure 2:
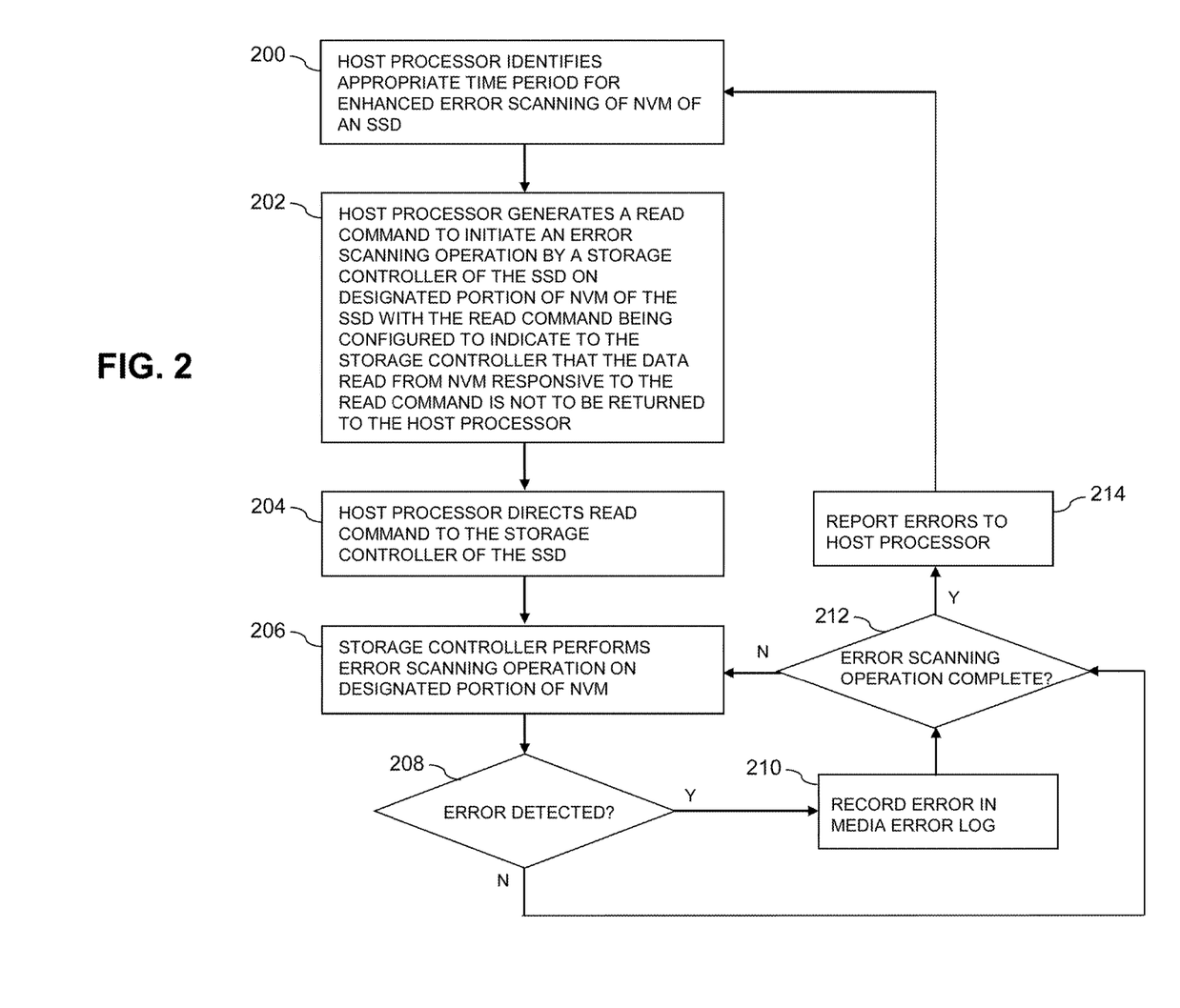
FIG. 2 is a flow diagram of a process for host-directed enhanced error scanning of a solid-state storage device in the system of FIG. 1.

The particular process as illustrated in FIG. 2 represents one example of an enhanced error scanning process that may be implemented in the system 100, although it is to be appreciated that numerous other types of enhanced error scanning processes may be implemented in the system 100 in other embodiments. The description below refers to an NVM of an SSD, which is illustratively non-volatile memory 122 of the solid-state storage device 108. The host processor and storage controller referred to in the description below are illustratively the host processor 102 and the storage controller 120 of system 100. The process to be described can be implemented in other systems.

In step 200, the host processor identifies an appropriate time period for enhanced error scanning of the NVM of the SSD. As error scanning generally involves the SSD performing functions such as reading data, checking ECC information, detecting and correcting errors and rewriting data, it may have a negative impact on the performance of the SSD when host activity is at a high level that requires full SSD resources. The host processor in step 200 can therefore identify a time period in which it will be more advantageous for error scanning to be performed, such as when host activity is expected to be at a lower level.

In step 202, the host processor generates a read command to initiate an error scanning operation by a storage controller of the SSD on a designated portion of the NVM of the SSD with the read command being configured to indicate to the storage controller that the data read from the NVM responsive to the read command is not to be returned to the host processor. By way of example, the read command in some embodiments comprises an SGL bit bucket descriptor indicating that the data read from the non-volatile memory responsive to the read command is to be discarded rather than returned to the host processor. Other types of read commands or arrangements of multiple such commands can be used to initiate an error scanning operation in other embodiments.

In step 204, the host processor directs the read command to the storage controller of the SSD.

In step 206, the storage controller performs an error scanning operation on the designated portion of the NVM.

In step 208, a determination is made as to whether or not an error has been detected in the designated portion of the NVM. If an error has been detected, the process moves to step 210, and otherwise moves to step 212.

In step 210, the detected error is recorded in a media error log such as the error log 126 of storage controller 120.

In step 212, a determination is made as to whether or not the error scanning operation is complete. If the error scanning operation is complete, the process moves to step 214, and otherwise returns to step 206 to continue the error scanning operation.

In step 214, any errors recorded in the media error log are reported to the host processor. The process then returns to step 200, at which point the host processor can identify an appropriate time period for enhanced error scanning and initiate an error scanning operation for another designated portion of the NVM. The process can therefore be repeated in multiple distinct appropriate time periods in order to provide error scanning of all desired portions of the NVM of the SSD.

It should be appreciated that the read commands and associated error scanning operations in some implementations of the FIG. 2 process need not be sequenced in the particular manner shown in the figure. For example, in some implementations of the FIG. 2 process, multiple read commands are generated at step 202 and their further processing at step 204 and subsequent steps may be at least partially concurrent or otherwise overlapped. Accordingly, multiple instances of the FIG. 2 process can be concurrently active for different read commands and associated error scanning operations.

The reporting of detected errors from the storage controller of the SSD to the host processor are performed at the completion of the error scanning operation for the designated portion of the NVM, but alternative arrangements are possible. For example, individual errors can be reported as such errors are detected. Also, errors that are reported in conjunction with execution of the FIG. 2 process can be limited to those errors that are detected but are not correctable by the error correcting code.

In conjunction with a given return of the process to step 200, the process may automatically proceed to step 202 to initiate another error scanning operation. Thus, the determination in step 200 may be that the appropriate time period for enhanced error scanning begins as soon as a previous instance of the process is completed. In other implementations of the process, one or more returns may be made directly to step 202 rather than to step 200 as illustrated in the figure. For example, some embodiments of the process can be configured to perform a sequence of error scanning operations without repeating step 200.

The detected errors can be identified to the host processor in a number of different ways. For example, the storage controller can record in the media error log the logical blocks containing uncorrectable errors and then periodically or otherwise provide information from the media error log to the host processor.

In addition, the SSD may post a specific error response indication for the read command, or issue an asynchronous event to the host processor alerting the host processor that one or more new entries were added to the media error log.

As a result, the host processor is able to get early notification of a faulty media page before any need arises to actively access and read from that location. The host processor can then implement one or more recovery mechanisms, depending on the specific inaccessible logical blocks.

For example, if the data stored in the logical blocks identified as containing uncorrectable errors is not currently needed by the host processor, the host processor may rewrite the logical blocks with host processor selected data values to simply make the logical blocks readable again, or alternatively, if such functionality is supported by the SSD, to instruct the SSD to deallocate and/or unmap the logical blocks.

As another example, if the data stored in the logical blocks is currently needed by the host processor, the data may be recovered by a higher-level host protection mechanism. In one such protection mechanism, the host processor can recover the data from a mirrored redundant copy maintained within the system and then rewrite the recovered data to the logical blocks that were identified as containing uncorrectable errors or to other logical blocks.

Other examples of higher-level host protection mechanisms include RAID techniques and erasure coding techniques. Such techniques may be used to reconstruct the needed data which can then be rewritten to the identified logical blocks or to other logical blocks.

It should also be noted that the above-described enhanced error scanning mode of operation can be combined with additional error scanning processes that scan portions of the NVM for errors based on an amount of time since the data was last written or based on adjacent memory access to isolate cells that are more susceptible to failure.

In the FIG. 2 process, the host processor can initiate error scanning on a specific set of LBAs, as opposed to the SSD firmware scanning the full span of the SSD media. For example, the host processor may instruct the SSD to scan specific LBAs when the data stored at those LBAs has a different level of importance compared to other data stored on the SSD. The specific LBAs can include LBAs with valid host data as opposed to unused LBAs, or LBAs storing data for a more important host application or file system. These can other designated portions of the NVM of the SSD can be identified by the host processor as candidates for initiation of a targeted error scanning operation.

The host processor in step 202 illustratively generates a read command that causes the SSD to read the data and any corresponding error correction code information for the designated portion of the NVM but does not require the SSD to pass the data back to the host memory. As indicated above, this can be accomplished using an SGL bit bucket descriptor with the read command, which allows the data read from the designated portion of the NVM to be discarded and not transferred to the host processor.

In some embodiments, the host processor in generating the read command in step 202 also sets a force-media-access parameter to ensure that the SSD retrieves all data contents from the NVM for each requested logical block, instead of invoking any optimization steps that may skip any or all portion of media data transfer altogether due to the presence of an SGL bit bucket descriptor that prevents the same data from being sent back to the host processor. As indicated previously, this can be accomplished by setting an FUA bit to a logic one value in the read command.

Additionally or alternatively, the host processor in generating the read command in step 202 sets a limit-media-error-recovery parameter, in order to allow the SSD to more aggressively find marginally-accessible logical blocks, such as logical blocks that are close to the ECC error correction limits, before those blocks persistently become inaccessible on the media. This can more particularly be accomplished by setting the above-noted LR bit to a logic one value in the read command.

The read command generated by the host processor in step 202 can also increase the level of data validation performed by the SSD during the error scanning operation by instructing the storage controller to also check any or all portions of T10 Data Integrity Format protection information that may be present in the data. As mentioned previously, this can be accomplished by setting one or more of the PRCHK, ILBRT, LBATM and LBAT fields to appropriate values in the read command.

In each of the above-described read command arrangements, the storage controller of the SSD will not transfer any of the data read from the designated portion of the NVM to the host processor.

Again, it is to be appreciated that the particular read command fields, configurations and formats described above are presented by way of illustrative example only. Numerous alternative read command arrangements can be used in implementing the FIG. 2 process and other illustrative embodiments.

For example, the host processor can supply to the SSD other command parameters such as request queue priority and desired access latency that influence SSD resource division between error scanning operations and host processor read and write operations.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a host processor and at least one solid-state storage device. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement error scanning operations on different ones of a plurality of non-volatile memories possibly associated with different host processors and different solid-state storage device of a storage system comprising multiple such components. Additionally or alternatively, multiple instances of the process can be active in parallel on the same host processor and solid-state storage device.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments disclosed herein can provide a number of significant advantages relative to conventional arrangements.

For example, one or more embodiments provide an efficient mechanism for causing a solid-state storage device to enter an enhanced error scanning mode of operation that provides more efficient detection of errors in flash memory or other non-volatile memory of a solid-state storage device.

In some embodiments, the host processor controls the performance of error scanning operations on particular designated portions of the non-volatile memory of a solid-state storage device but without requiring that the data read from those portions be returned by the solid-state storage device to the host processor. This conserves resources for both the host processor and the solid-state storage device.

In addition, the host processor can schedule and prioritize the performance of error scanning operations on different portions of the non-volatile memory of the solid-state storage device. Such arrangements can minimize the adverse impacts of error scanning on normal read and write operations of the host processor, thereby improving the overall operating performance of the solid-state storage device.

In some embodiments, detected errors are logged by the solid-state storage device and reported to the host processor, such that the host processor can proactively attempt to recover the data from faulty pages ahead of any future need to access the data. Such arrangements advantageously provide a higher level of data reliability compared to conventional error scanning techniques.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host processor 102, I/O controller 106, solid-state storage device 108 and PCIe switch 110 are illustratively implemented in the form of software running on one or more processing devices. As a more particular example, command generator 118 of host processor 102 and scanning logic 128 of storage controller 120 in solid-state storage device 108 in some embodiments are implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of storage systems, processors, memories, controllers, switches, solid-state storage devices and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A storage system comprising:
a host processor; and
a solid-state storage device coupled to the host processor and comprising a non-volatile memory and a storage controller;
wherein the host processor is configured to initiate an error scanning operation on a designated portion of the non-volatile memory by directing at least one read command to the storage controller;
wherein the read command as generated by the host processor is configured to indicate to the storage controller that data read from the non-volatile memory responsive to the read command is not to be returned to the host processor regardless of whether or not the error scanning operation finds any errors;
the data read from the non-volatile memory responsive to the read command thereby not being returned to the host processor even if no errors are detected in that data by the error scanning operation;
wherein the host processor by issuing multiple read commands controls the performance of respective corresponding error scan operations on different portions of the non-volatile memory of the solid-state storage device;
wherein said at least one read command comprises one or more of a force-media-access parameter that is set by the host processor to instruct the storage controller to retrieve all available data from the non-volatile memory for each of a plurality of designated logical blocks, and a limit-media-error-recovery parameter that is set by the host processor to instruct the storage controller to more aggressively identify marginal instances of logical blocks in the designated portion of the non-volatile memory; and
wherein said at least one read command is configured by the host processor to instruct the storage controller to check available data integrity format protection information for the designated portion of the non-volatile memory.

2. The storage system of claim 1 wherein said at least one read command identifies as the designated portion of the non-volatile memory subject to the error scanning operation a particular set of logical block addresses that designate one or more portions of the non-volatile memory.

3. The storage system of claim 1 wherein the designated portion of the non-volatile memory subject to the error scanning operation comprises a portion of the non-volatile memory that is determined by the host processor to contain data of a higher importance level or a greater value than data contained in other portions of the non-volatile memory.

4. The storage system of claim 1 wherein the designated portion of the non-volatile memory subject to the error scanning operation comprises one or more portions of the non-volatile memory that are each determined by the host processor to contain valid host data.

5. The storage system of claim 1 wherein said at least one read command comprises a Scatter Gather List (SGL) bit bucket descriptor indicating that the data read from the non-volatile memory responsive to the read command is to be discarded rather than returned to the host processor.

6. The storage system of claim 1 wherein the force-media-access parameter comprises a Force Unit Access (FUA) bit that is set by the host processor to a logic one value in the read command.

7. The storage system of claim 1 wherein the limit-media-error-recovery parameter comprises a Limited Retry (LR) bit that is set by the host processor to a logic one value in the read command.

8. The storage system of claim 1 wherein the host processor instructs the storage controller to check available data integrity format protection information by setting at least one of a Protection Information Check (PRCHK) field, an Initial Logical Block Reference Tag (ILBRT) field, a Logical Block Application Tag Mask (LBATM) field, and a Logical Block Application Tag (LBAT) field to respective designated values in the read command.

9. The storage system of claim 1 wherein the error scanning operation comprises performing error correction code checks on data stored in the designated portion of the non-volatile memory.

10. The storage system of claim 1 wherein for a given error detected as part of the error scanning operation, the storage controller is configured:
to record information identifying a logical block containing the given error in a media error log; and
to notify the host processor of the given error.

11. The storage system of claim 1 wherein the host processor is configured:
to identify a period of relatively low host processor activity requiring minimal resources of the solid-state storage device; and
to generate said at least one read command for the identified period.

12. The storage system of claim 1 wherein the host processor is configured to initiate at least one of the following operations responsive to an error notification from the storage controller relating to a particular logical block:
to rewrite the logical block with data designated by the host processor;
to recover the logical block using a higher-level host protection mechanism; and
to instruct the storage controller to deallocate the logical block.

13. The storage system of claim 1 further comprising a PCIe switch having an upstream port coupled to a given one of a plurality of root ports of a PCIe root complex of the host processor and a downstream port coupled to the solid-state storage device.

14. A method comprising:
generating at least one read command in a host processor of a storage system; and
directing said at least one read command to a storage controller of a solid-state storage device of the storage system;
wherein said at least one read command initiates an error scanning operation by the storage controller on a designated portion of a non-volatile memory of the solid-state storage device;
wherein the read command as generated by the host processor is configured to indicate to the storage controller that data read from the non-volatile memory responsive to the read command is not to be returned to the host processor regardless of whether or not the error scanning operation finds any errors;
the data read from the non-volatile memory responsive to the read command thereby not being returned to the host processor even if no errors are detected in that data by the error scanning operation;
wherein the host processor by issuing multiple read commands controls the performance of respective corresponding error scan operations on different portions of the non-volatile memory of the solid-state storage device;
wherein said at least one read command comprises one or more of a force-media-access parameter that is set by the host processor to instruct the storage controller to retrieve all available data from the non-volatile memory for each of a plurality of designated logical blocks, and a limit-media-error-recovery parameter that is set by the host processor to instruct the storage controller to more aggressively identify marginal instances of logical blocks in the designated portion of the non-volatile memory; and
wherein said at least one read command is configured by the host processor to instruct the storage controller to check available data integrity format protection information for the designated portion of the non-volatile memory.

15. The method of claim 14 wherein said at least one read command comprises a Scatter Gather List (SGL) bit bucket descriptor indicating that the data read from the non-volatile memory responsive to the read command is to be discarded rather than returned to the host processor.

16. A computer program product comprising a non-transitory processor-readable storage medium having stored therein program code of one or more software programs, wherein the program code, when executed by a storage system comprising a host processor and a solid-state storage device, the solid-state storage device having a non-volatile memory and a storage controller, causes the storage system:
to generate at least one read command in the host processor; and
to direct said at least one read command to the storage controller of the solid-state storage device;
wherein said at least one read command initiates an error scanning operation by the storage controller on a designated portion of the non-volatile memory of the solid-state storage device;
wherein the read command as generated by the host processor is configured to indicate to the storage controller that data read from the non-volatile memory responsive to the read command is not to be returned to the host processor regardless of whether or not the error scanning operation finds any errors;
the data read from the non-volatile memory responsive to the read command thereby not being returned to the host processor even if no errors are detected in that data by the error scanning operation;

wherein the host processor by issuing multiple read commands controls the performance of respective corresponding error scan operations on different portions of the non-volatile memory of the solid-state storage device;

wherein said at least one read command comprises one or more of a force-media-access parameter that is set by the host processor to instruct the storage controller to retrieve all available data from the non-volatile memory for each of a plurality of designated logical blocks, and a limit-media-error-recovery parameter that is set by the host processor to instruct the storage controller to more aggressively identify marginal instances of logical blocks in the designated portion of the non-volatile memory; and wherein said at least one read command is configured by the host processor to instruct the storage controller to check available data integrity format protection information for the designated portion of the non-volatile memory.

17. The computer program product of claim 16 wherein said at least one read command comprises a Scatter Gather List (SGL) bit bucket descriptor indicating that the data read from the non-volatile memory responsive to the read command is to be discarded rather than returned to the host processor.

18. The computer program product of claim 16 wherein the host processor instructs the storage controller to check available data integrity format protection information by setting at least one of a Protection Information Check (PRCHK) field, an Initial Logical Block Reference Tag (ILBRT) field, a Logical Block Application Tag Mask (LBATM) field, and a Logical Block Application Tag (LBAT) field to respective designated values in the read command.

19. The computer program product of claim 16 wherein for a given error detected as part of the error scanning operation, the storage controller is configured:

to record information identifying a logical block containing the given error in a media error log; and to notify the host processor of the given error.

20. The computer program product of claim 16 wherein the host processor is configured:

to identify a period of relatively low host processor activity requiring minimal resources of the solid-state storage device; and to generate said at least one read command for the identified period.

* * * * *